United States Patent
Zang

(10) Patent No.: US 11,810,376 B2
(45) Date of Patent: Nov. 7, 2023

(54) METHOD, APPARATUS AND STORAGE MEDIUM FOR DETECTING SMALL OBSTACLES

(71) Applicant: Beijing Xiaomi Intelligent Technology Co., Ltd., Beijing (CN)

(72) Inventor: Yutong Zang, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 274 days.

(21) Appl. No.: 16/870,966

(22) Filed: May 9, 2020

(65) Prior Publication Data
US 2021/0149411 A1    May 20, 2021

(30) Foreign Application Priority Data
Nov. 19, 2019    (CN) .......................... 201911135772.5

(51) Int. Cl.
*G06V 20/64*    (2022.01)
*G06T 7/73*    (2017.01)
(Continued)

(52) U.S. Cl.
CPC ............. *G06V 20/64* (2022.01); *G05D 1/027* (2013.01); *G05D 1/0221* (2013.01);
(Continued)

(58) Field of Classification Search
CPC .. G05D 1/0238; G05D 1/0221; G05D 1/0251; G05D 1/027; G05D 2201/0203;
(Continued)

(56) References Cited

U.S. PATENT DOCUMENTS 11,199,853 B1* 12/2021 Afrouzi ................ G05D 1/0246
2018/0136332 A1   5/2018 Barfield, Jr. et al.
2020/0409382 A1* 12/2020 Herman ............... G05D 1/0094

FOREIGN PATENT DOCUMENTS

CN    107741234 A    2/2018
CN    109141364 A    1/2019
(Continued)

OTHER PUBLICATIONS

English Translation of WO 2018101631 A2 (Year: 2018).*
(Continued)

*Primary Examiner* — David P. Merlino
*Assistant Examiner* — Matthew Ho
(74) *Attorney, Agent, or Firm* — SYNCODA LLC; Feng Ma

(57) ABSTRACT

A method for detecting small obstacles includes: acquiring a first 3D point cloud corresponding to image data acquired by a cleaning robot; extracting, from the first 3D point cloud, a second 3D point cloud of a ground region; extracting, from the second 3D point cloud, a third 3D point cloud having a height value in a set height range; calculating a ground projection point cloud of the third 3D point cloud; and, determining morphologically-connected regions in the ground projection point cloud, and using a morphologically-connected region having an area less than a preset value as a region where a small obstacle is located. By effectively recognizing the ground, acquiring the ground projection point cloud and processing the point cloud by image processing, accuracy and timeliness of the algorithm can be improved compared with directly processing discrete 3D point clouds.

14 Claims, 12 Drawing Sheets

(51) Int. Cl.
  *G05D 1/02* (2020.01)
  *G06V 20/58* (2022.01)
  *G06F 18/2413* (2023.01)
  *G06V 20/10* (2022.01)

(52) U.S. Cl.
  CPC ......... *G05D 1/0238* (2013.01); *G05D 1/0251* (2013.01); *G06F 18/24147* (2023.01); *G06T 7/74* (2017.01); *G06V 20/10* (2022.01); *G06V 20/58* (2022.01); *G05D 2201/0203* (2013.01); *G06T 2207/10028* (2013.01)

(58) Field of Classification Search
  CPC ............ G06T 7/74; G06T 2207/10028; G06K 9/6276
  See application file for complete search history.

(56) References Cited

FOREIGN PATENT DOCUMENTS

| | | | | |
|---|---|---|---|---|
| CN | 109903326 A | * | 6/2019 | ......... G06K 9/00214 |
| CN | 110216664 A | | 9/2019 | |
| CN | 110286387 A | | 9/2019 | |
| CN | 106931975 B | * | 10/2019 | ............ G01C 21/20 |
| CN | 110378964 A | * | 10/2019 | ............... G06T 7/80 |
| CN | 110441791 A | | 11/2019 | |
| EP | 3367199 A1 | * | 8/2018 | ............. B25J 11/00 |
| WO | WO-2018101631 A2 | * | 6/2018 | ........... A47L 9/2805 |

OTHER PUBLICATIONS

English Translation of EP 3367199 A1 (Year: 2018).*
English Translation of CN 109903326 A (Year: 2019).*
English Translation of CN 106931975 B (Year: 2019).*
"Pileun Kim, SLAM-driven robotic mapping and registration of 3D point clouds, Feb. 3, 2018, ScienceDirect, 43-44" (Year: 2018).*
"Ruixu Liu, SLAM for Robotic Navigation by Fusing RGB-D and Inertial Data in Recurrent and Convolutional Neural Networks, 2019 , IEEE, 2-5" (Year: 2019).*
English translation of CN-110378964-A.*
Extended European Search Report in U.S. Appl. No. 20/179,224, dated Nov. 30, 2020.
Yang Gaoqiang et al :"A new algorithm for obstacle segmentation in dynamic environments using a RGB-D sensor", 2016 IEEE International Conference on Real-Time Computing and Robotics (RCAR), IEEE, Jun. 6, 2016, pp. 374-378, XP033022943.
Yuxing Xie et al :"A Review of Point Cloud Semantic Segmentation", arxiv.org, Cornell University Ithaca, NY 14853, Aug. 23, 2019, XP081468407.
Lobo J et al :"Ground plane detection using visual and inertial data fusion", Electronics, Circuits and Systems, 1998 IEEE International Conference on Lisboa, Portugal Sep. 7-10, 1998, Piscataway, NJ, USA IEEE, US, vol. 2, Sep. 7, 1998, pp. 479-482, XP010366255.
Liu Ruixu et al :"SLAM for Robotic Navigation by Fusing RGB-D and Inertial Data in Recurrent and Convolutional Neural Networks", 2019 IEEE 5th International Conference on Mechatronics System and Robots (ICMSR), IEEE, May 3, 2019, pp. 1-6, XP033617139.
China first office action and search report in Application No. 201911135772.5, dated Oct. 27, 2022.
Jing Zhang: Research on Digital Image Processing Application, Publisher: Jilin University Press, Apr. 2019.
Dejun Wan: Ship Navigation Instrument Design Manual, Publisher: National Defense Industry Press, Dec. 1, 1991.
European Patent Office Action in Application No. 20179224.9, dated Jan. 19, 2023.

* cited by examiner

METHOD, APPARATUS AND STORAGE MEDIUM FOR DETECTING SMALL OBSTACLES

CROSS-REFERENCE TO RELATED APPLICATION

This application claims priority to Chinese Patent Application No. 201911135772.5 filed on Nov. 19, 2019, the disclosure of which is hereby incorporated by reference in its entirety.

BACKGROUND

To move in an environment autonomously, a mobile robot needs to have good obstacle recognition and avoidance capabilities. Obstacle avoidance methods have been continuously developed.

SUMMARY

The present disclosure relates generally to the technical field of robot control, and more specifically to a method, an apparatus and a medium for detecting small obstacles.

In accordance with a first aspect of the embodiments of the present disclosure, a method for detecting small obstacles is provided, applied to a cleaning robot, the method including steps of:
  acquiring a first 3D point cloud corresponding to image data acquired by the cleaning robot;
  extracting, from the first 3D point cloud, a second 3D point cloud of a ground region;
  extracting, from the second 3D point cloud, a third 3D point cloud having a height value in a set height range;
  calculating a ground projection point cloud of the third 3D point cloud;
  determining morphologically-connected regions in the ground projection point cloud; and
  using a morphologically-connected region having an area less than a preset value as a region where a small obstacle is located.

In an implementation, the method further includes:
acquiring first inertial measurement unit data collected by one or more sensors of the cleaning robot; and
the extracting, from the first 3D point cloud, a second 3D point cloud of a ground region includes:
  searching, in a map set, second inertial measurement unit data closest to the first inertial measurement unit data;
  determining plane information corresponding to the second inertial measurement unit data according to the mapping set; and
  extracting, from the first 3D point cloud, a second 3D point cloud of a ground region, according to the plane information;
  wherein the mapping set includes a mapping relationship between second inertial measurement unit data and plane information, and the plane information is used for indicating a plane in a world coordinate system.

In an implementation, the method further includes:
acquiring first inertial measurement unit data collected by one or more sensors of the cleaning robot; and
the extracting, from the first 3D point cloud, a second 3D point cloud of a ground region includes:
  inputting the first inertial measurement unit data into a first model to obtain plane information output by the first model; and
  extracting, from the first 3D point cloud, a second 3D point cloud of a ground region, according to the plane information;
  wherein the plane information is used for indicating a plane in a world coordinate system.

In an implementation, the method further includes:
training a learning model by using a training data set to obtain the first model;
  wherein training input data and training output data in one-to-one correspondence in the training data set are inertial measurement unit data and plane information corresponding to ground data in a 3D point cloud acquired by the cleaning robot at a same historical moment, respectively.

In an implementation, the method further includes:
performing fitting processing on the ground projection point cloud by any one of the following methods: a random sample consensus algorithm and a nonlinear optimization algorithm.

In an implementation, the method further includes:
performing noise elimination processing on the ground projection point cloud by a morphological opening operation and a morphological closing operation.

In accordance with a second aspect of the embodiments of the present disclosure, an apparatus for detecting small obstacles is provided, applied to a cleaning robot, the apparatus including:
  a processor; and
  a memory device configured to store instructions executable for the processor that, when executed by the processor, causes the processor to:
  acquire a first 3D point cloud corresponding to image data acquired by the cleaning robot;
  extract, from the first 3D point cloud, a second 3D point cloud of a ground region;
  extract, from the second 3D point cloud, a third 3D point cloud having a height value in a set height range;
  calculate a ground projection point cloud of the third 3D point cloud;
  determine morphologically-connected regions in the ground projection point cloud; and
  use a morphologically-connected region having an area less than a preset value as a region where a small obstacle is located.

In an implementation, the instructions further cause the processor to:
  acquire first inertial measurement unit data collected by one or more sensors of the cleaning robot; and
  search, in a mapping set, second inertial measurement unit data closest to the first inertial measurement unit data, the mapping set including a mapping relationship between second inertial measurement unit data and plane information;
  determine plane information corresponding to the second inertial measurement unit data according to the mapping set; and
  extract, the first 3D point cloud, a second 3D point cloud of a ground region, according to the plane information.

In an implementation, the instructions further cause the processor to:
  acquire first inertial measurement unit data collected by one or more sensors of the cleaning robot; and
  input the first inertial measurement unit data into a first model to obtain plane information output by the first model; and extract, from the first 3D point cloud, a second 3D point cloud of a ground region, according to the plane information;

wherein the plane information is used for indicating a plane in a world coordinate system.

In an implementation, the instructions further cause the processor to:

train a learning model by using a training data set to obtain the first model;

wherein training input data and training output data in one-to-one correspondence in the training data set are inertial measurement unit data and plane information corresponding to ground data in a 3D point cloud acquired by the cleaning robot at a same historical moment, respectively.

In an implementation, the instructions further cause the processor to:

perform fitting processing on the ground projection point cloud by any one of the following methods: a random sample consensus algorithm and a nonlinear optimization algorithm.

In an implementation, the instructions further cause the processor to:

perform noise elimination processing on the ground projection point cloud by a morphological opening operation and a morphological closing operation.

In accordance with a third aspect of the embodiments of the present disclosure, provided is a non-transitory computer-readable storage medium storing instructions that, when executed by a processor of a mobile terminal, enable the mobile terminal to execute a method for detecting small obstacles, the method including operations of:

acquiring a first 3D point cloud corresponding to image data acquired by the cleaning robot;

extracting, from the first 3D point cloud, a second 3D point cloud of a ground region;

extracting, from the second 3D point cloud, a third 3D point cloud having a height value in a set height range;

calculating a ground projection point cloud of the third 3D point cloud;

determining morphologically-connected regions in the ground projection point cloud; and using a morphologically-connected region having an area less than a preset value as a region where a small obstacle is located.

It should be understood that the foregoing general description and the following detailed description are merely exemplary and explanatory and not intended to limit the present disclosure.

BRIEF DESCRIPTION OF THE DRAWINGS

The accompanying drawings to be described herein are incorporated into this disclosure and constitute a part of this disclosure. These accompanying drawings show the embodiments of the present disclosure, and are used with this specification to explain the principle of the present disclosure.

DETAILED DESCRIPTION

Figure 1:
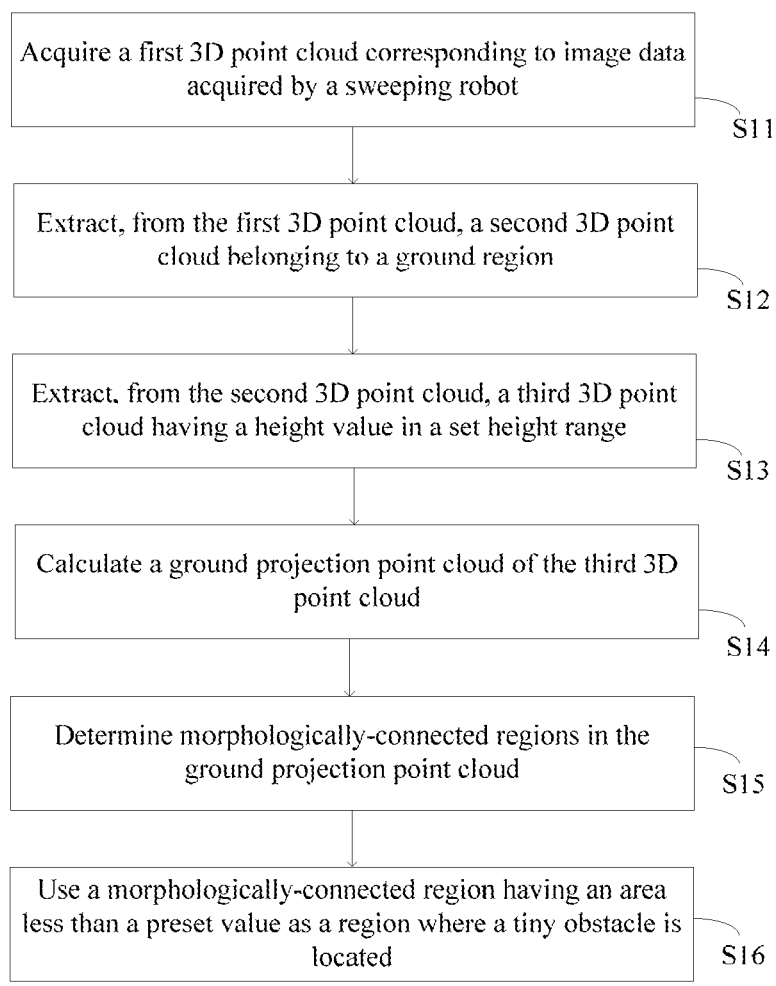
FIG. 1 is a flowchart of a method for detecting small obstacles according to an exemplary embodiment.

Exemplary embodiments will be described in detail herein, and examples in the exemplary embodiments are shown in the accompanying drawings. When the accompanying drawings are involved in the following description, unless otherwise indicated, identical reference numerals in different accompanying drawings indicate identical or similar elements. The implementations described in the following exemplary embodiments do not represent all implementations consistent with the present disclosure. Instead, the implementations are merely examples of apparatuses and methods consistent with some aspects of the present disclosure as described in the appended claims.

Obstacle detection can be realized with laser radars or RGBD cameras. For an indoor mobile robot, the obstacle detection is implemented mainly by a planar laser radar. Although obstacles at a certain height can be recognized in the solutions, it is very difficult to recognize small obstacles and depressions because it is difficult to mount the camera at a very low position on the robot and ensure the camera completely in a horizontal state. However, these small obstacles and depressions will affect the normal operation of the robot. For example, the wheels of the cleaning robot may be entangled by very thin wires, hair or the cleaning robot may smear the pet's excrement on the floor during operation, or the like.

Deep learning methods involving a variety of different sensors may be employed provide more comprehensive and more robust obstacle detection algorithms.

An embodiment of the present disclosure provides a method for detecting small obstacles. FIG. 1 is a flowchart of a method for detecting small obstacles according to an exemplary embodiment. This method is applied to a cleaning robot. As shown in FIG. 1, the method includes the following steps.

Step S11: A first 3D point cloud corresponding to image data acquired by the cleaning robot is acquired.

Step S12: A second 3D point cloud of a ground region is extracted from the first 3D point cloud.

Step S13: A third 3D point cloud having a height value in a set height range is extracted from the second 3D point cloud.

Step S14: A ground projection point cloud of the third 3D point cloud is calculated.

Step S15: Morphologically-connected regions in the ground projection point cloud are determined, and a morphologically-connected region having an area less than a preset value is used as a region where a small obstacle is located.

Each point in the first 3D point cloud in the step S11 has 3D information that is used for indicating the spatial location of each point. The first 3D point cloud is calculated from the image data acquired by the cleaning robot through coordinate transformation. Since the position of the camera on the cleaning robot cannot be too close to the ground, the images acquired by the camera include images of non-ground parts (e.g., wall, furniture, etc.) in addition to images of ground parts.

In the step S12, the second 3D point cloud is a ground region part in the first 3D point cloud. The second 3D point cloud can be recognized from the first 3D point cloud by different ground region recognition algorithms.

When the set height range in the step S13 is a range containing a positive range and a negative range (e.g., greater than −1 cm and less than 1 cm), raised obstacles and depressed obstacles on the ground can be simultaneously detected by this method. When the set height range is a range greater than 0 (e.g., greater than 0 and less than 1 cm), raised obstacles can be detected by this method. When the set height range is a range less than 0 (e.g., greater than −1 cm and less than 0), depressed obstacles can be detected by this method.

In the step S14, during the calculation of the ground projection point cloud of the third 3D point cloud, a ground plane in the third 3D point cloud is firstly determined, and the third 3D point cloud is then projected onto this ground plane to obtain a two-dimensional ground projection point cloud.

Figure 2:
FIG. 2 is a schematic view of a ground projection point cloud in a step S14 of FIG. 14 according to an exemplary embodiment.

FIG. 2 is a schematic view of a ground projection point cloud. In FIG. 2, a continuous part having the maximum gray value is a part of a ground projection point cloud corresponding to a raised obstacle on the ground.

In this method, a first 3D point cloud corresponding to image data acquired by a cleaning robot is used, and a portion of a ground region is extracted, from the first 3D point cloud, as a target range of interest. An existence range of common obstacles is further extracted from the target range of interest by using the characteristic that height information is carried in the point cloud. Morphological analysis is performed on ground projection information of this existence range, and a small obstacle range to be detected is selected from each suspected obstacle region. Small obstacles on the ground can be effectively recognized by this method.

An embodiment of the present disclosure further provides a method for detecting small obstacles. In this method, the approach to acquire 3D point cloud data in the step S11 shown in FIG. 1 is one of the following approaches.

Approach 1: A depth image is acquired by a depth camera arranged on the cleaning robot, and coordinate transformation is performed on the depth image to obtain a first 3D point cloud.

Approach 2: An RGB depth image is acquired by an RGBD camera arranged on the cleaning robot, a depth image is extracted from the RGB depth image, and coordinate transformation is performed on the depth image to obtain a first 3D point cloud.

Approach 3: A first 3D point cloud of a cleaning robot is remotely received through wireless communication.

In the approach 1 and approach 2, the depth image, also referred to as a range image, refers to an image using the distance (depth) from the image collector to each point in the scenario as a pixel value. Each pixel point in the depth image represents the distance from an object closest to the plane of the camera to the plane, the object being at the particular coordinates (x, y) in the field of view of one or more depth sensors to an object.

The process of performing a coordinate transformation on the depth image to obtain the first 3D point cloud data is realized according to a camera calibration principle. The camera calibration principle is formalized as:

$$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} [R\ T] \begin{bmatrix} x_w \\ y_w \\ z_w \\ 1 \end{bmatrix},$$

where u and v are any coordinate points in an image coordinate system; $u_0$ and $v_0$ are central coordinates of the image, respectively; $x_w$, $y_w$ and $z_w$ are three-dimensional coordinate points in a world coordinate system; $z_c$ represents a z-axis value of camera coordinates, i.e., a distance from the target to the camera; and, R and T are a 3×3 rotation matrix and a 3×1 translation matrix of external parameter matrices, respectively.

Since the origin of world coordinates and the origin of the camera are coincide, that is, there is no rotation or translation, then:

$$R = \begin{bmatrix} 0 & 0 & 0 \\ 0 & 1 & 0 \\ 0 & 0 & 1 \end{bmatrix}, T = \begin{bmatrix} 0 \\ 0 \\ 0 \end{bmatrix}.$$

The origin of the camera coordinate system and the origin of the world coordinate system can coincide, such that a same object in the camera coordinates and the world coordinates has a same depth, that is, $z_c = z_w$. Hence, the formula can be further simplified as:

$$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} x_w \\ y_w \\ z_c \\ 1 \end{bmatrix}.$$

The transformation formula from the image point $[u, v]^T$ to the world coordinate point can be calculated from the above transformation matrix:

$$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} x_w \\ y_w \\ z_c \\ 1 \end{bmatrix}.$$

The image acquired by the camera mounted on the cleaning robot generally includes a ground region and a non-ground region. To recognize small obstacles, it is necessary to obtain the ground region accurately. The small jitter or jolt of the cleaning robot during its movement due to uneven ground or unsmooth start/stop will lead to a large recognition error of the ground region, thereby affecting the subsequent recognition of small obstacles.

To solve the problem of the large recognition error of the ground region due to the jitter or jolt of the cleaning robot during running, an embodiment of the present disclosure further provides a method for detecting small obstacles.

Figure 3:
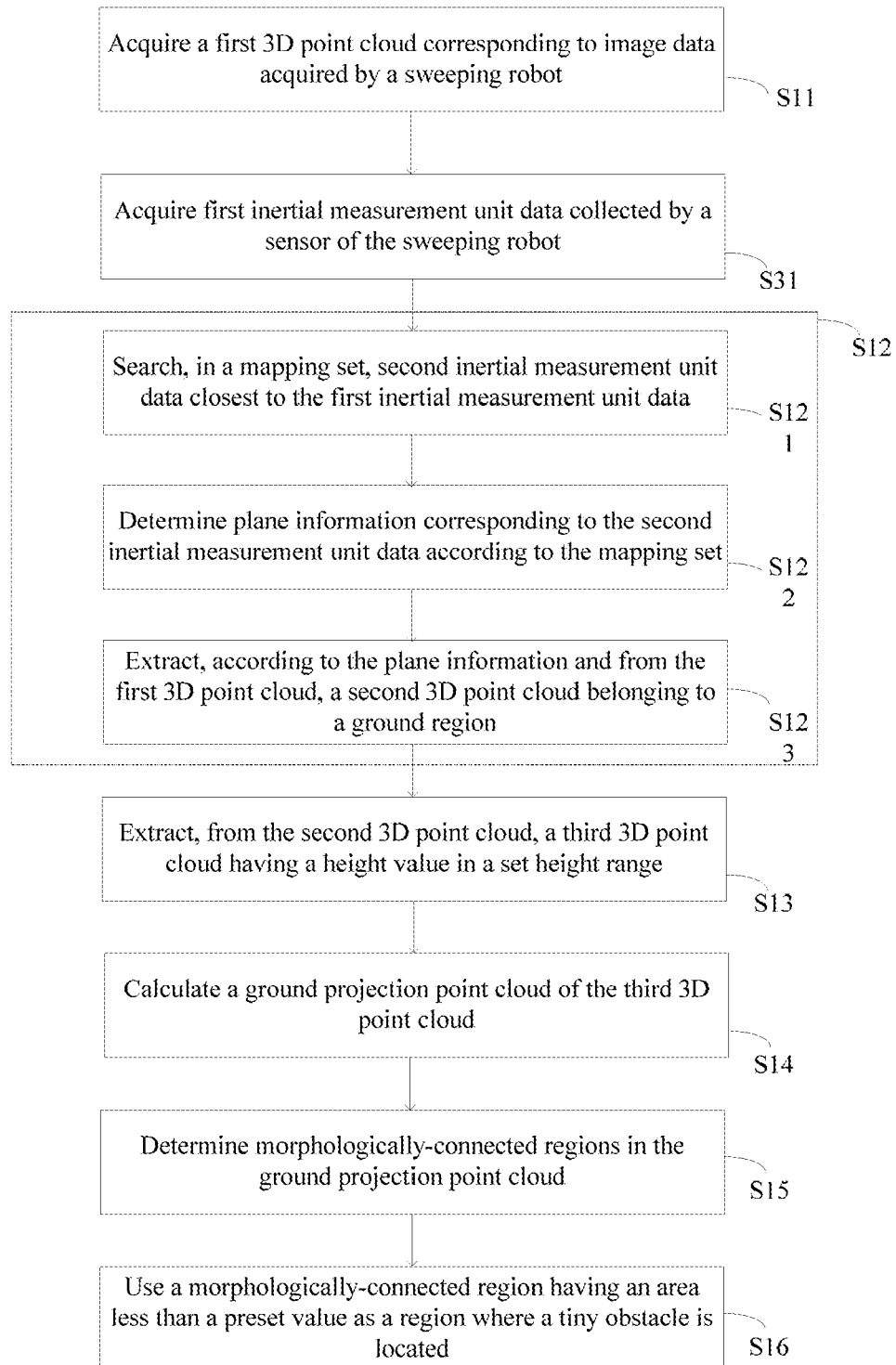
FIG. 3 is a flowchart of a method for detecting small obstacles according to an exemplary embodiment.

FIG. 3 shows a method for detecting small obstacles according to an exemplary embodiment. As shown in FIG. 3, the method in FIG. 1 further includes the following step.

Step S31: First inertial measurement unit data collected by one or more sensors of the cleaning robot is acquired. The inertial measurement unit data includes: angular velocity and/or acceleration.

The step S31 in FIG. 3 is located between the steps S11 and S12, but the execution position of the step S31 is not limited to that shown in FIG. 3. In another embodiment, the step S31 may be performed before the step S11.

As shown in FIG. 3, the step S12 in FIG. 1 includes the following steps.

S121: Second inertial measurement unit data closest to the first inertial measurement unit data is searched in a mapping set.

Step S122: Plane information corresponding to the second inertial measurement unit data is determined according to the mapping set.

Step S123: A second 3D point cloud of a ground region is extracted from the first 3D point cloud according to the plane information.

The plane information is used for indicating a plane in a world coordinate system. For example, in the world coordinates (x, y, z), a unique plane can be determined according to $ax+by+cz+d=0$. The plane information may be a set of specific values of a, b, c and d.

The mapping set includes a mapping relationship between second inertial measurement unit data and plane information. The mapping set is constructed according to the historical second inertial measurement unit data of the cleaning robot during operation and the corresponding plane information. If there are more mapping relationships in the mapping set, the accuracy of the second inertial measurement unit data is higher, and the ground region recognized by using the mapping set is more accurate.

The inertial measurement unit data is continuous data with a preset duration. In the processing of searching the second inertial measurement unit data closest to the first inertial measurement unit data, a k-Nearest Neighbor algorithm is used.

To solve the problem of the large recognition error of the ground region due to the jitter or jolt of the cleaning robot during running, an embodiment of the present disclosure further provides a method for detecting small obstacles.

Figure 4:
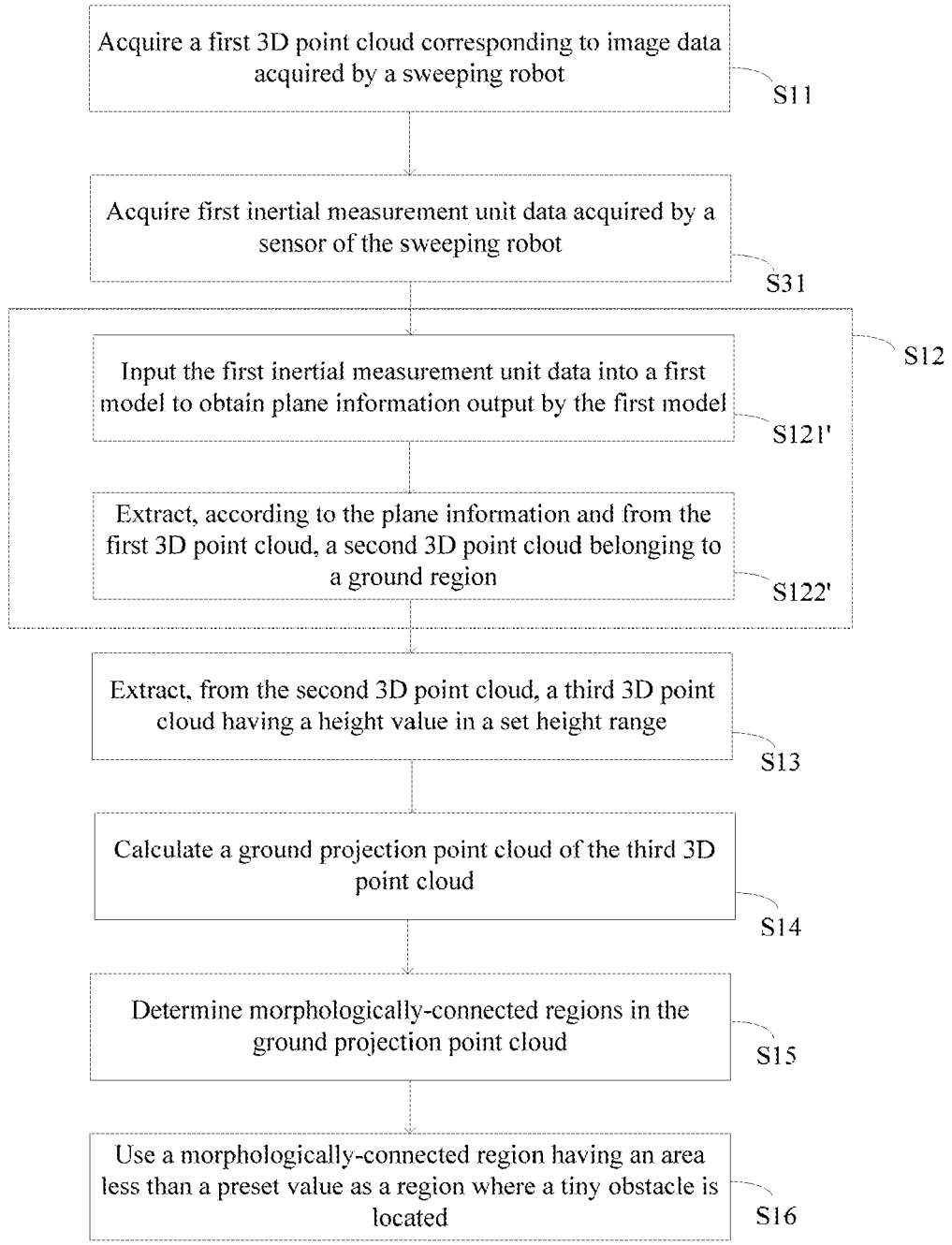
FIG. 4 is a flowchart of a method for detecting small obstacles according to an exemplary embodiment.

FIG. 4 shows a method for detecting small obstacles according to an exemplary embodiment. As shown in FIG. 4, the method in FIG. 1 further includes the following step.

Step S31: First inertial measurement unit data acquired by one or more sensors of the cleaning robot is acquired.

The step S31 in FIG. 4 is located between the steps S11 and S12, but the execution position of the step S31 is not limited to that shown in FIG. 4. In another embodiment, the step S31 may be performed before the step S11.

As shown in FIG. 4, the step S12 in FIG. 1 includes the following steps.

Step S121': The first inertial measurement unit data is input into a first model to obtain plane information output by the first model.

Step S122': A second 3D point cloud of a ground region is extracted from the first 3D point cloud according to the plane information.

The first model is a preset model for recognizing plane information according to the inertial measurement unit data.

The first model may also be a sustainable learning model. Specifically, a learning model is trained by using a training data set to obtain the first model. Training input data and training output data in one-to-one correspondence in the training data set are inertial measurement unit data and plane information corresponding to ground data in a 3D point cloud acquired by the cleaning robot at a same historical moment, respectively. For example, the first model is a multilayer neural network, including an input layer, one or more hidden layers and an output layer. The number of neurons in each hidden layer is adjusted according to the dimensionality of the inertial measurement unit data, the training accuracy and other information.

In this embodiment, by a learning model capable of self-learning, the ground region can still be accurately recognized when the cleaning robot jitters or jolts during operation, and training samples are increased continuously by using historical data of the cleaning robot in different scenarios, so that the accuracy, stability and robustness of the learning model can be continuously improved.

An embodiment of the present disclosure further provides a method for detecting small obstacles.

Figure 5:
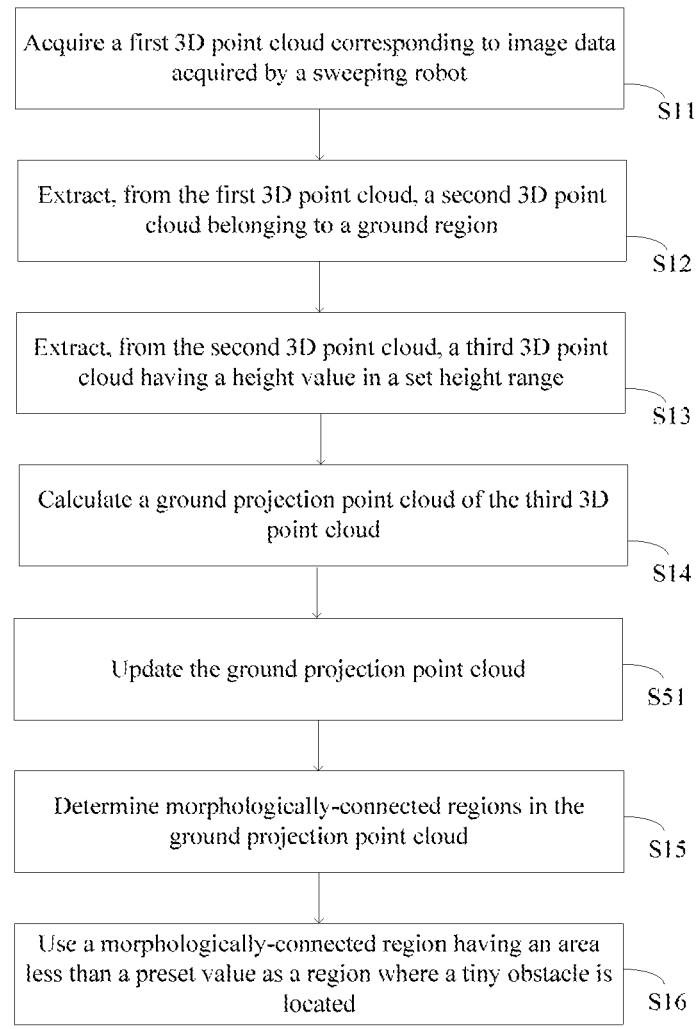
FIG. 5 is a flowchart of a method for detecting small obstacles according to an exemplary embodiment.

FIG. 5 shows a method for detecting small obstacles according to an exemplary embodiment. As shown in FIG. 5, the method in FIG. 1 further includes the following step between the steps S14 and S15. Step S51: The ground projection point cloud is updated. Specifically, ground fitting is performed on the ground projection point cloud to remove noise data other than the ground.

The ground fitting may be performed in one of the following approaches: a random sample consensus (RANSAC) algorithm and a nonlinear optimization algorithm.

An embodiment of the present disclosure further provides a method for detecting small obstacles.

Figure 6:
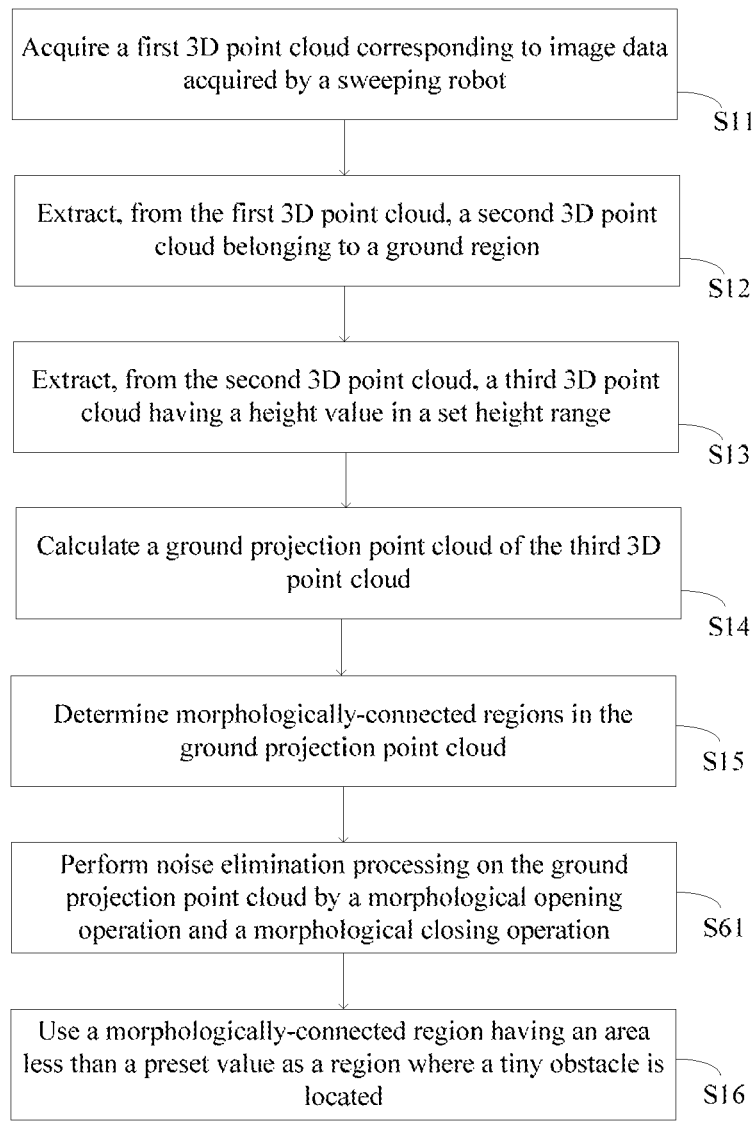
FIG. 6 is a flowchart of a method for detecting small obstacles according to an exemplary embodiment.

FIG. 6 shows a method for detecting small obstacles according to an exemplary embodiment. As shown in FIG. 6, the method in FIG. 1 further includes the following step between the steps S15 and S16. Step S61: Noise elimination is performed on the ground projection point cloud by a morphological opening operation and a morphological closing operation. Thus, a connection area (which can be considered as noise) having an area smaller than the area of small obstacles to a large extent is removed, the recognition accuracy of small obstacles is improved, and the processing efficiency is improved.

An embodiment of the present disclosure further provides an apparatus for detecting small obstacles.

Figure 7:
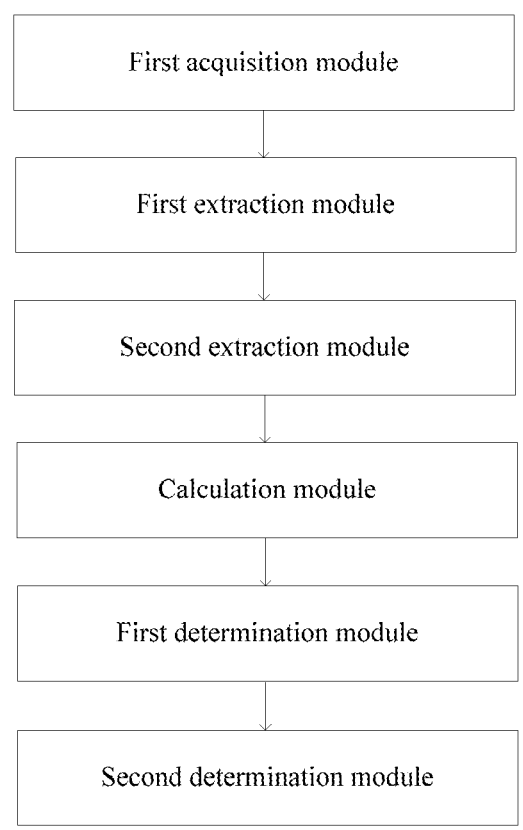
FIG. 7 is a structure diagram of an apparatus for detecting small obstacles according to an exemplary embodiment.

FIG. 7 is a structure diagram of an apparatus for detecting small obstacles according to an exemplary embodiment. This apparatus is applied to a cleaning robot. As shown in FIG. 7, the apparatus includes:

a first acquisition component configured to acquire a first 3D point cloud corresponding to image data acquired by the cleaning robot;

a first extraction component configured to extract, from the first 3D point cloud, a second 3D point cloud of a ground region;

a second extraction component configured to extract, from the second 3D point cloud, a third 3D point cloud having a height value in a set height range;

a calculation component configured to calculate a ground projection point cloud of the third 3D point cloud;

a first determination component configured to determine morphologically-connected regions in the ground projection point cloud; and a second determination component configured to use a morphologically-connected region having an area less than a preset value as a region where a small obstacle is located.

An embodiment of the present disclosure further provides an apparatus for detecting small obstacles.

Figure 8:
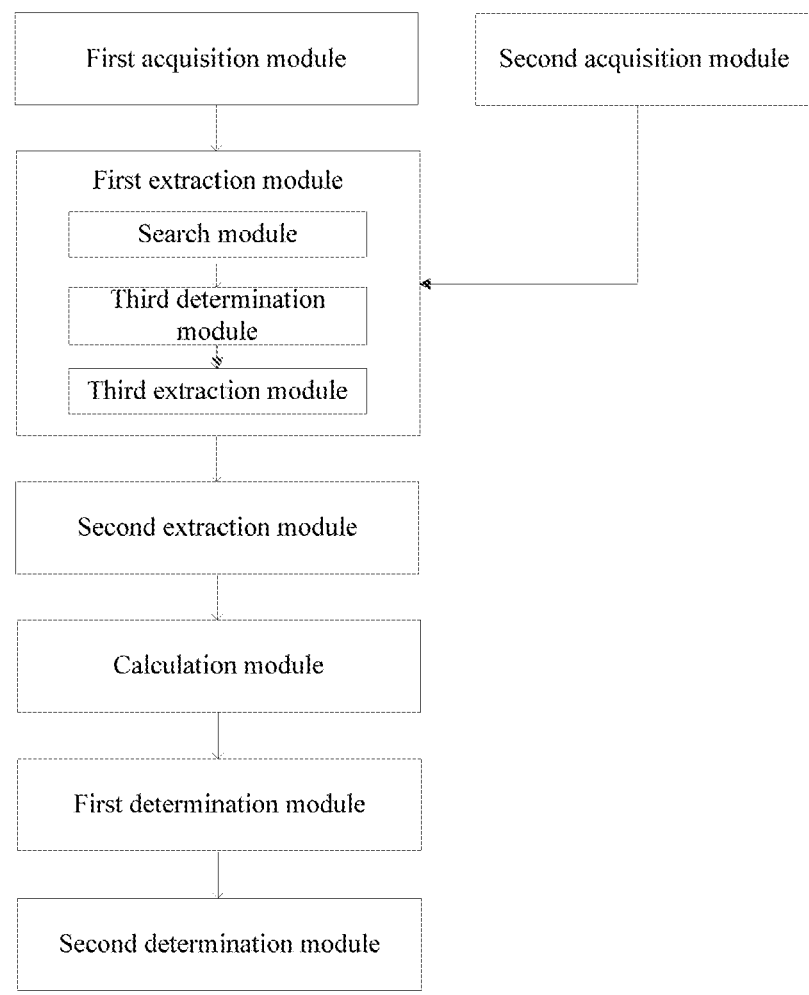
FIG. 8 is a structure diagram of an apparatus for detecting small obstacles according to an exemplary embodiment.

FIG. 8 is a structure diagram of an apparatus for detecting small obstacles according to an exemplary embodiment. Based on FIG. 7, this apparatus further includes:

a second acquisition component configured to acquire first inertial measurement unit data collected by one or more sensors of the cleaning robot; and the first extraction component includes:

a search component configured to search, in a mapping set, second inertial measurement unit data closest to the first inertial measurement unit data, the mapping set including a mapping relationship between second inertial measurement unit data and plane information;

a third determination component configured to determine plane information corresponding to the second inertial measurement unit data according to the mapping set; and a third extraction component configured to extract, from the first 3D point cloud, a second 3D point cloud of a ground region, according to the plane information.

An embodiment of the present disclosure further provides an apparatus for detecting small obstacles.

Figure 9:
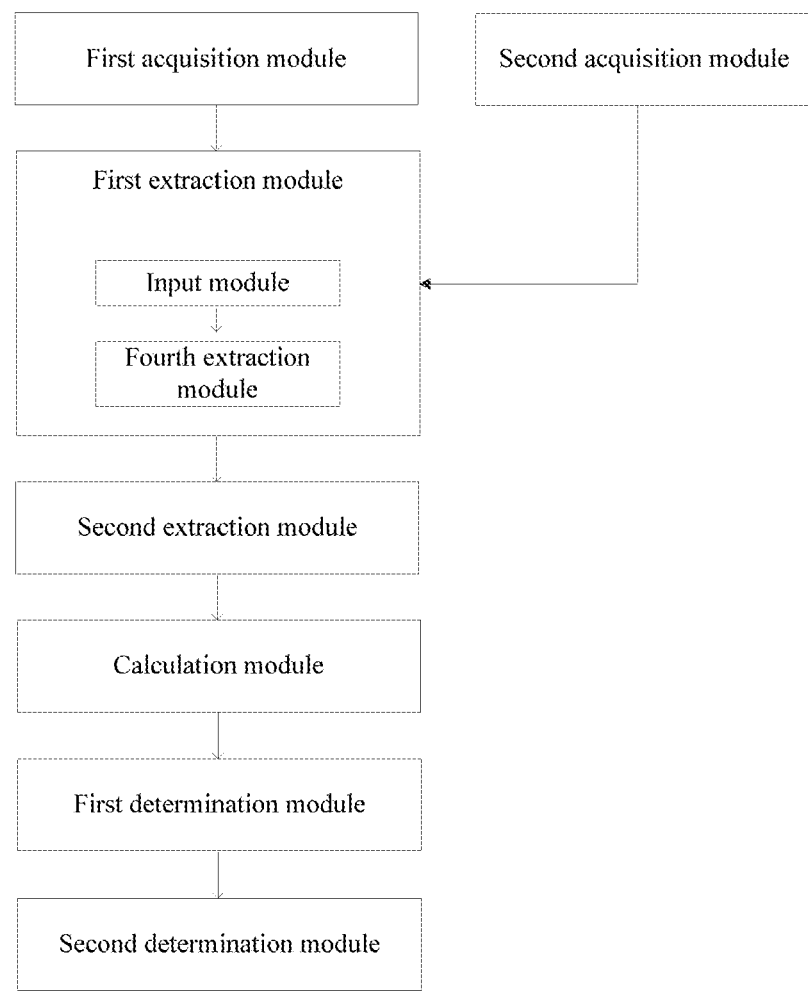
FIG. 9 is a structure diagram of an apparatus for detecting small obstacles according to an exemplary embodiment.

FIG. 9 is a structure diagram of an apparatus for detecting small obstacles according to an exemplary embodiment. Based on FIG. 7, this apparatus further includes:

a second acquisition component configured to acquire first inertial measurement unit data collected by one or more sensors of the cleaning robot; and the first extraction component includes:

an input component configured to input the first inertial measurement unit data into a first model to obtain plane information output by the first model; and a fourth extraction component configured to extract, from the first 3D point cloud, a second 3D point cloud of a ground region, according to the plane information;

wherein the plane information is used for indicating a plane in a world coordinate system.

An embodiment of the present disclosure further provides an apparatus for detecting small obstacles.

Figure 10:
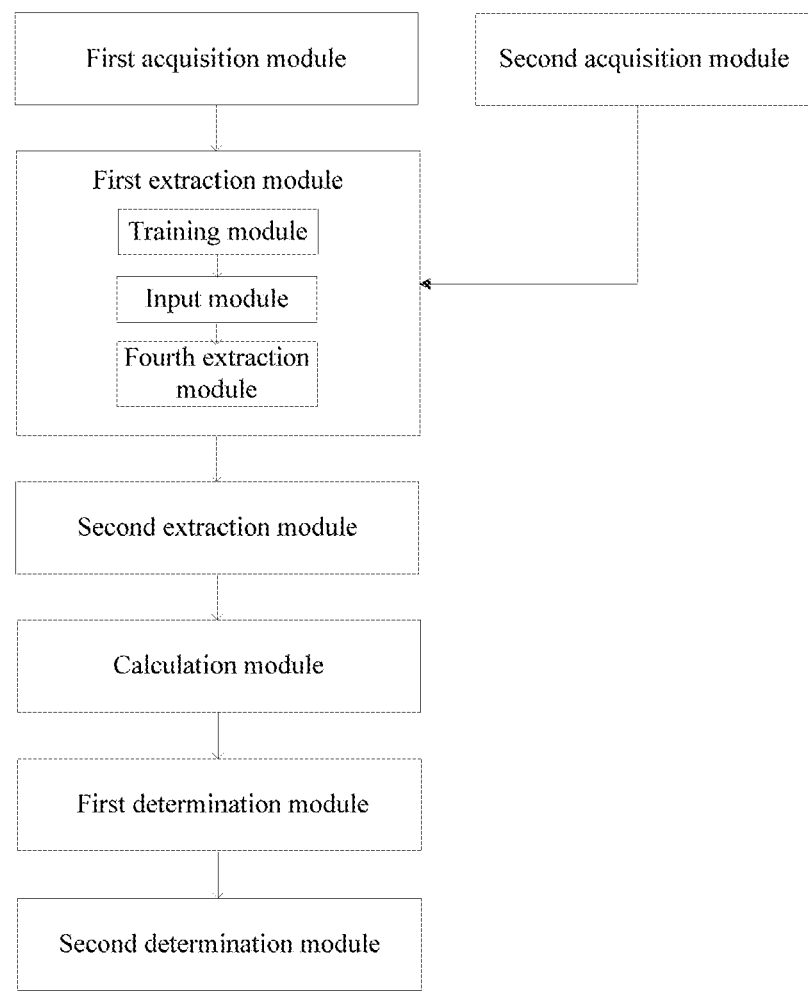
FIG. 10 is a structure diagram of an apparatus for detecting small obstacles according to an exemplary embodiment.

FIG. 10 is a structure diagram of an apparatus for detecting small obstacles according to an exemplary embodiment. Based on FIG. 9, this apparatus further includes:

a training component configured to train a learning model by using a training data set to obtain the first model.

Training input data and training output data in one-to-one correspondence in the training data set are inertial measurement unit data and plane information corresponding to ground data in a 3D point cloud acquired by the cleaning robot at a same historical moment, respectively.

An embodiment of the present disclosure further provides an apparatus for detecting small obstacles.

Figure 11:
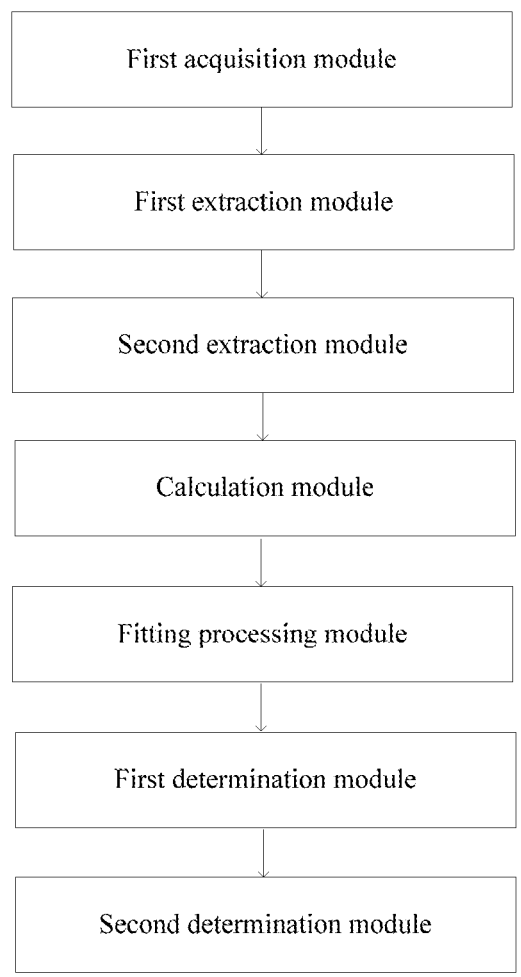
FIG. 11 is a structure diagram of an apparatus for detecting small obstacles according to an exemplary embodiment.

FIG. 11 is a structure diagram of an apparatus for detecting small obstacles according to an exemplary embodiment. Based on FIG. 7, this apparatus further includes:

a fitting processing component configured to perform fitting processing on the ground projection point cloud by any one of the following methods: a random sample consensus algorithm and a nonlinear optimization algorithm.

An embodiment of the present disclosure further provides an apparatus for detecting small obstacles.

Figure 12:
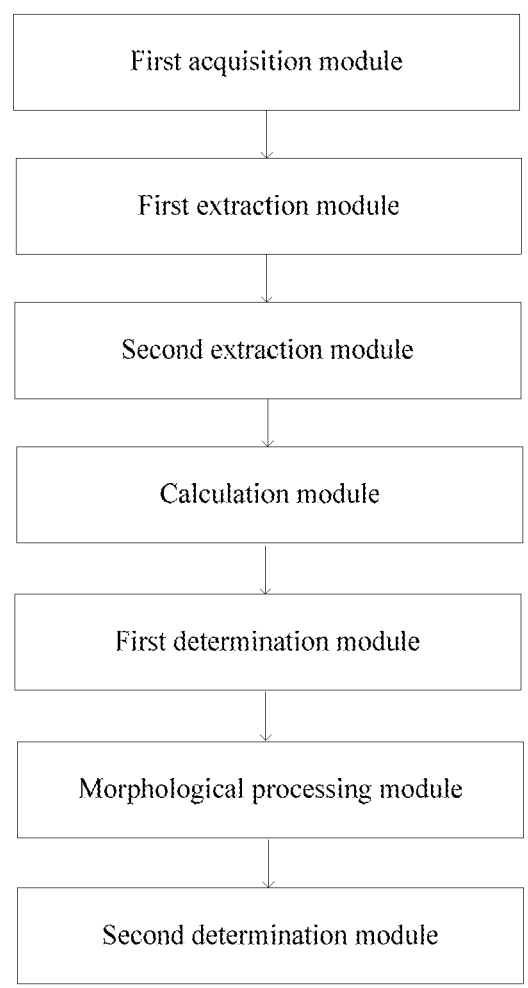
FIG. 12 is a structure diagram of an apparatus for detecting small obstacles according to an exemplary embodiment.

FIG. 12 is a structure diagram of an apparatus for detecting small obstacles according to an exemplary embodiment. Based on FIG. 7, this apparatus further includes:

a morphological processing component configured to perform noise elimination processing on the ground projection point cloud by a morphological opening operation and a morphological closing operation.

An embodiment of the present disclosure further provides a non-transitory computer-readable storage medium storing instructions that, when executed by a processor of a mobile terminal, enable the mobile terminal to execute a method for detecting small obstacles, the method including steps of:

acquiring a first 3D point cloud corresponding to image data acquired by the cleaning robot;

extracting, from the first 3D point cloud, a second 3D point cloud of a ground region;

extracting, from the second 3D point cloud, a third 3D point cloud having a height value in a set height range;

calculating a ground projection point cloud of the third 3D point cloud;

determining morphologically-connected regions in the ground projection point cloud; and using a morphologically-connected region having an area less than a preset value as a region where a small obstacle is located.

Accordingly, a cleaning system can be provided according to some embodiments, which can include the cleaning robot, and the mobile terminal. The software for controlling the robot and implementing operations of the methods described above can reside on the cleaning robot, the mobile terminal, or a combination thereof. In some embodiments, the cleaning system can further include a server having computer program thereon to perform the methods.

In some embodiments, the cleaning system can include a plurality of cleaning robots, which can perform collaborative cleaning of a larger space, such as an office space.

Various embodiments of the present disclosure can have one or more of the following advantages.

A first 3D point cloud corresponding to image data acquired by a cleaning robot can be used, and a portion of a ground region can be extracted, from the first 3D point cloud, as a target range of interest. An existence range of common obstacles is further extracted from the target range of interest by using the characteristic that height information is carried in the point cloud. Morphological analysis is performed on ground projection information of this range, and a small obstacle range to be detected is selected from each suspected obstacle region. Small obstacles on the ground can be effectively recognized by this method.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for detecting small obstacles, applied to a cleaning robot and being implemented by a processor in the cleaning robot, the method comprising steps of:
acquiring a first 3D point cloud corresponding to image data acquired by the cleaning robot and first inertial measurement unit data collected by one or more sensors of the cleaning robot;
extracting, from the first 3D point cloud, a second 3D point cloud of a ground region;
extracting, from the second 3D point cloud, a third 3D point cloud having a height value in a set height range, wherein the set height range is a range containing a positive and/or a negative range;
calculating a ground projection point cloud of the third 3D point cloud;
determining morphologically-connected regions in the ground projection point cloud; and
using a morphologically-connected region having an area less than a preset value as a region where a small obstacle is located;
wherein an approach to acquire 3D point cloud data contains: an RGB depth image is acquired by an RGBD camera arranged on the cleaning robot, a depth image is extracted from the RGB depth image, and coordinate transformation is performed on the depth image to obtain the first 3D point cloud; or the first 3D point cloud of the cleaning robot is remotely received through wireless communication;
wherein the extracting, from the first 3D point cloud, a second 3D point cloud of a ground region comprises:
obtaining plane information by one of the following:
(i) searching, in a mapping set, second inertial measurement unit data closest to the first inertial measurement unit data; determining plane information corresponding to the second inertial measurement unit data according to the mapping set; wherein the mapping set is constructed according to historical second inertial measurement unit data of the cleaning robot during operation and corresponding plane information, and the mapping set comprises a mapping relationship between the historical second inertial measurement unit data and the plane information; or
(ii) training a learning model by using a training data set to obtain a first model;
wherein training input data and training output data in one-to-one correspondence in the training data set are respectively inertial measurement unit data and plane information corresponding to ground data in a 3D point cloud acquired by the cleaning robot at a same historical moment, respectively;
inputting the first inertial measurement unit data into the first model to obtain plane information output by the first model;
wherein the extracting, from the first 3D point cloud, a second 3D point cloud of a ground region further comprises:
extracting, from the first 3D point cloud, a second 3D point cloud of a ground region, according to the plane information;
wherein the plane information is used for indicating a plane in a world coordinate system.

2. The method according to claim 1, further comprising:
performing fitting processing on the ground projection point cloud by any one of the following methods: a random sample consensus algorithm and a nonlinear optimization algorithm.

3. The method according to claim 1, further comprising:
performing noise elimination processing on the ground projection point cloud by a morphological opening operation and a morphological closing operation.

4. A cleaning system implementing the method of claim 1, comprising the cleaning robot having a camera, wherein the system is configured to perform a coordinate transformation on a depth image to obtain the first 3D point cloud data according to a camera calibration principle formalized as:

$$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} [R\ T] \begin{bmatrix} x_w \\ y_w \\ z_w \\ 1 \end{bmatrix},$$

wherein u and v are any coordinate points in an image coordinate system; $u_0$ and $v_0$ are central coordinates of the image, respectively; $x_w$, $y_w$ and $z_w$ are three-dimensional coordinate points in a world coordinate system; $z_c$ represents a z-axis value of camera coordinates, which is a distance from the target to the camera; and, R and T are a 3×3 rotation matrix and a 3×1 translation matrix of external parameter matrices, respectively.

5. The cleaning system of claim 4, wherein origin of world coordinates and origin of the camera coincide, such that there is no rotation or translation, and $$R = \begin{bmatrix} 0 & 0 & 0 \\ 0 & 1 & 0 \\ 0 & 0 & 1 \end{bmatrix}, T = \begin{bmatrix} 0 \\ 0 \\ 0 \end{bmatrix}.$$

6. The cleaning system of claim 5, wherein the origin of the camera coordinate system and the origin of the world coordinate system coincide, such that a same object in the camera coordinates and the world coordinates has a same depth, that is, $$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} x_w \\ y_w \\ z_c \\ 1 \end{bmatrix}.$$

7. The cleaning system of claim 5, wherein a transformation formula from the image point $[u, v]^T$ to the world coordinate point $[x_w, y_w, z_w]^T$ is calculated from:

$$z_c \begin{pmatrix} u \\ v \\ 1 \end{pmatrix} = \begin{bmatrix} f/dx & 0 & u_0 \\ 0 & f/dy & v_0 \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} x_w \\ y_w \\ z_c \\ 1 \end{bmatrix}.$$

8. The cleaning system of claim 7, wherein the system is configured, based on a self-learning model, to accurately recognize the ground region when the cleaning robot jitters or jolts during operation due to uneven ground or unsmooth start/stop, and increase training samples continuously by using historical data of the cleaning robot in different scenarios.

9. The cleaning system of claim 8, wherein:
the cleaning robot comprises one or more sensors configured to obtain inertial measurement unit data continuously with a preset duration, including angular velocity and/or acceleration indicating the jitters or jolts;
the inertial measurement unit data include first inertial measurement unit data;
the system is configured to search, using a k-Nearest Neighbor algorithm, second inertial measurement unit data closest to the first inertial measurement unit data in a mapping set, and determine plane information corresponding to the second inertial measurement unit data according to the mapping set;
the second 3D point cloud of a ground region is extracted from the first 3D point cloud according to the plane information for indicating a plane in the world coordinate system.

10. The cleaning system of claim 9, further comprising a mobile phone configured to implement operations of the method for detecting small obstacles and to control the cleaning robot.

11. An apparatus for detecting small obstacles, applied to a cleaning robot, the apparatus comprising:
a processor; and
a memory device configured to store instructions executable for the processor that, when executed by the processor, causes the processor to:
acquire a first 3D point cloud corresponding to image data acquired by the cleaning robot and first inertial measurement unit data collected by one or more sensors of the cleaning robot;
extract, from the first 3D point cloud, a second 3D point cloud of a ground region;
extract, from the second 3D point cloud, a third 3D point cloud having a height value in a set height range, wherein the set height range is a range containing a positive and/or a negative range;
calculate a ground projection point cloud of the third 3D point cloud;
determine morphologically-connected regions in the ground projection point cloud; and
use a morphologically-connected region having an area less than a preset value as a region where a small obstacle is located;
wherein an approach to acquire 3D point cloud data contains: an RGB depth image is acquired by an RGBD camera arranged on the cleaning robot, a depth image is extracted from the RGB depth image, and coordinate transformation is performed on the depth image to obtain the first 3D point cloud; or the first 3D point cloud of the cleaning robot is remotely received through wireless communication;
wherein the instructions further cause the processor to:
obtain plane information by one of the following:
(i) searching, in a mapping set, second inertial measurement unit data closest to the first inertial measurement unit data; determining plane information corresponding to the second inertial measurement unit data according to the mapping set; wherein the mapping set is constructed according to historical second inertial measurement unit data of the cleaning robot during operation and corresponding plane information, and the mapping set comprises a mapping relationship between the historical second inertial measurement unit data and the plane information; or (ii) train a learning model by using a training data set to obtain a first model;
wherein training input data and training output data in one-to-one correspondence in the training data set are respectively inertial measurement unit data and plane information corresponding to ground data in a 3D point cloud acquired by the cleaning robot at a same historical moment, respectively;
inputting the first inertial measurement unit data into the first model to obtain plane information output by the first model;
wherein the instructions further cause the processor to:
extract, from the first 3D point cloud, a second 3D point cloud of a ground region, according to the plane information;
wherein the plane information is used for indicating a plane in a world coordinate system.

12. The apparatus according to claim 11, wherein the instructions further cause the processor to:
perform fitting processing on the ground projection point cloud by any one of the following methods: a random sample consensus algorithm and a nonlinear optimization algorithm.

13. The apparatus according to claim 11, wherein the instructions further cause the processor to:
perform noise elimination processing on the ground projection point cloud by a morphological opening operation and a morphological closing operation.

14. A non-transitory computer-readable storage medium storing instructions that, when executed by a processor of a mobile terminal, enable the mobile terminal to execute a method for detecting small obstacles, the method comprising operations of:
acquiring a first 3D point cloud corresponding to image data acquired by the cleaning robot and first inertial measurement unit data collected by one or more sensors of the cleaning robot;
extracting, from the first 3D point cloud, a second 3D point cloud of a ground region;
extracting, from the second 3D point cloud, a third 3D point cloud having a height value in a set height range, wherein the set height range is a range containing a positive and/or a negative range;
calculating a ground projection point cloud of the third 3D point cloud;
determining morphologically-connected regions in the ground projection point cloud; and
using a morphologically-connected region having an area less than a preset value as a region where a small obstacle is located;
wherein an approach to acquire 3D point cloud data contains: an RGB depth image is acquired by an RGBD camera arranged on the cleaning robot, a depth image is extracted from the RGB depth image, and coordinate transformation is performed on the depth image to obtain the first 3D point cloud; or the first 3D point cloud of the cleaning robot is remotely received through wireless communication;
wherein the extracting, from the first 3D point cloud, a second 3D point cloud of a ground region comprises:
obtaining plane information by one of the following:
(i) searching, in a mapping set, second inertial measurement unit data closest to the first inertial measurement unit data; determining plane information corresponding to the second inertial measurement unit data according to the mapping set; wherein the mapping set is constructed according to historical second inertial measurement unit data of the cleaning robot during operation and corresponding plane information, and the mapping set comprises a mapping relationship between the historical second inertial measurement unit data and the plane information; or
(ii) training a learning model by using a training data set to obtain a first model;
wherein training input data and training output data in one-to-one correspondence in the training data set are respectively inertial measurement unit data and plane information corresponding to ground data in a 3D point cloud acquired by the cleaning robot at a same historical moment, respectively;
inputting the first inertial measurement unit data into the first model to obtain plane information output by the first model;
wherein the extracting, from the first 3D point cloud a second 3D point cloud of a ground region further comprises:
extracting, from the first 3D point cloud, a second 30 point cloud of a ground region, according to the plane information;
wherein the plane information is used for indicating a plane in a world coordinate system.

* * * * *